United States Patent [19]

McCarthy, deceased et al.

[11] Patent Number: 4,574,656

[45] Date of Patent: Mar. 11, 1986

[54] ANTI-SKID APPARATUS

[76] Inventors: Milton E. H. McCarthy, deceased, late of Ormond Beach, Fla.; by Helen McCarthy, representative, 359 Warwick Ave., Ormond Beach, Fla. 32074

[21] Appl. No.: 588,557

[22] Filed: Mar. 12, 1984

[51] Int. Cl.$^4$ .............................................. F16H 37/08
[52] U.S. Cl. ................................ 74/665 M; 74/710.5; 74/711
[58] Field of Search ................ 74/665 L, 665 M, 710, 74/710.5, 711, 713, 768, 769

[56] References Cited

U.S. PATENT DOCUMENTS

| | | | |
|---|---|---|---|
| 1,324,253 | 12/1919 | Indahl | 74/710.5 X |
| 1,362,076 | 12/1920 | Blom | 74/713 X |
| 1,418,452 | 6/1922 | Nisewanger | 74/710.5 |
| 1,424,118 | 7/1922 | Ramer | 74/710.5 |
| 1,682,386 | 8/1928 | Lewis | 74/710.5 |
| 2,121,915 | 6/1938 | Ifield | 74/711 |
| 3,288,232 | 11/1966 | Shepherd | 74/711 X |
| 4,156,547 | 5/1979 | Marsh | 74/711 X |
| 4,354,144 | 10/1982 | McCarthy | 318/13 |

FOREIGN PATENT DOCUMENTS 58-178040 10/1983 Japan .................... 74/710.5

Primary Examiner—William F. Pate, III
Assistant Examiner—Dwight G. Diehl
Attorney, Agent, or Firm—Duckworth, Allen, Dyer & Pettis

[57] ABSTRACT

In a vehicle using a differential apparatus for enabling the operator to quickly stop a skid. A set of electric clutches is attached to the idler pinion gears of the differential and to the spider. A centrifugal switch attached to a pinion responds to rapid rotation of the pinion which occurs during skidding to engage the electric clutches which thereby stop the spinning of the vehicle wheels permitting the drive to regain control. A time delay device maintains the clutches engaged for a short time after the centrifugal switch reopens.

10 Claims, 8 Drawing Figures

TO ANTI-SKID
ENGAGE
SWITCH (75)

ANTI-SKID APPARATUS

BACKGROUND OF THE INVENTION

1. Field of Invention

The present invention relates to apparatus to stop the skid of a motor vehicle and in particular, apparatus to be used with the vehicle having a double differential for this purpose.

2. Description of the Prior Art

In my U.S. Pat. No. 4,354,144 I disclose a continuously variable transmissionless drive system for a motor vehicle in which two direct current motors are utilized to drive two input shafts of a novel dual differential which in turn drive a pair of wheels. The dual differential may be adapted to provide a convenient way of halting a skid which such a vehicle might encounter on an icy or wet road. Generally, a skidding vehicle results when the tires lose traction permitting the wheels to spin and throw the vehicle from its normal path. In prior art vehicles, great skill is necessary on the part of the driver to manage to guide the vehicle out of the skid without collision and damage thereto. The basic problem is that the driver cannot control over the rotation of the wheels in a vehicle utilizing a differential and the rotational speed will be determined partly by the amount of or lack of traction for each wheel. The problem of skidding in a vehicle using a conventional differential may be solved with my anti-skid apparatus.

SUMMARY OF INVENTION

In my system defined in the U.S. Pat. No. 4,354,144, which is incorporated herein by reference, the following elements are provided: a double differential having a pair horizontally opposed double gears attached to the input drive shafts; a pair of idler pinion gears engaged with the driving bevel gears; a spider connected to the two pinion gears which may rotate therewith; another set of horizontally opposed bevel gears each attached to an output shaft concentric with one of the input shafts; and a pair of opposed pinion gears engaged with the two inner bevel gears and rotatable on a shaft coupled to the spider. In the present invention, the double differential is modified to include three electrical clutches attached to a modified spider and to the pinion gear shafts. The electrical clutches are arranged to be engaged by means of a centrifugal switch attached to a pinion gear. When the vehicle tends to skid, rotation of the pinion gear occurs, permitting the centrifugal switch to close. This switch controls the power to the electrical clutches which operate and immediately lock up the pinion gears which force the two output shafts to rotate at the same RPM. Thus, when a driver experiences a skid in the vehicle using my invention, the wheels will immediately lock up and turn at the same RPM as determined by the driving source. The tendency for one wheel to spin at a much higher rate than the other is cancelled. At the same time, the driver decelerates the system, permitting the tires to again secure traction and to thereby place the vehicle under the driver's control. Since closing of the centrifugal switch will cause the gears to lock up, the gears will quickly stop spinning and the centrifugal switch will again open. If this were to happen, the skid could redevelop; therefore, I also provide a slow release relay in conjunction with the operation of the clutches such that the clutches will release after a few seconds rather than intermittently.

The above described implementation of my invention utilizes a centrifugal switch to sense when the vehicle is in a skidding situation. An alternative embodiment utilizes an electronic sensing means. A toothed wheel is mounted on each of the wheel drive shafts and used in conjunction with conventional magnetic pick-ups to produce an ac signal when the shafts are turning in which the frequency of the signal is proportional to the rpm's of the respective shafts. The signal from each magnetic pick-up is fed to respective tachometer circuits which as is well known in the art, produce a dc output voltage proportional to the frequency of the input signal. The two signals are fed to a comparison circuit having an adjustable offset voltage. When the two shafts are turning at or near the same rpm such as is the case in normal driving conditions, no output occurs from the comparison circuit. However, if the vehicle should skid such that one wheel is spinning at a higher rate than the opposite wheel, and the difference in dc voltages from the two tachometer circuits exceeds the preset offset voltage adjustment, the comparison circuit will produce an output which is used to close a slow release relay.

As may be understood, all of the circuitry and sensing elements is mounted external to the differential housing. The rotatable spider within the differential housing in this implementation needs only a single slip ring and brush connected to the three electric clutches and parallel. The external brush connection then connects to normally open contacts on the slow release relay which serves to apply voltage to the electric clutches when the relay closes. As may be now understood, the centrifugal switch is eliminated.

My invention is also applicable to a conventional differential such as used in most automobiles. In such an application, an electric clutch is disposed between the two rear axle drive gears. An electronic sensing system senses when one wheel spins at a higher rate than the opposite wheel, and energizes the clutch. This action locks the two drive wheels permitting the driver to regain control of the vehicle. It is therefore a principal object of my invention to provide, for use with a double differential system in a vehicle, means for locking up a pair of pinion gears to force the two drive shafts to the wheels to turn at the same speed.

It is another object of the invention to provide centrifugal switch means which will respond to rapid rotation of the pinion gears in the differential to close circuits to a set of electrical clutches which then locks up the bevel gears in the differential.

It is yet another object of the invention to provide an anti-skid dual differential system having a manual control switch for manually locking up the differential to produce equal rpm of each output shaft.

It is still another object of the invention to provide an electronic tachometer device on each of the wheel drive shafts in a double differential type vehicle and a comparison circuit to sense when a large difference between the rpm of the drive wheels occurs to energize the set of electrical clutches when such condition is sensed.

These and other objects and advantages of my inventions will become apparent from the detailed descriptions and the drawings.

DETAILED DESCRIPTION OF THE PREFERRED EMBODIMENT

Figure 1:
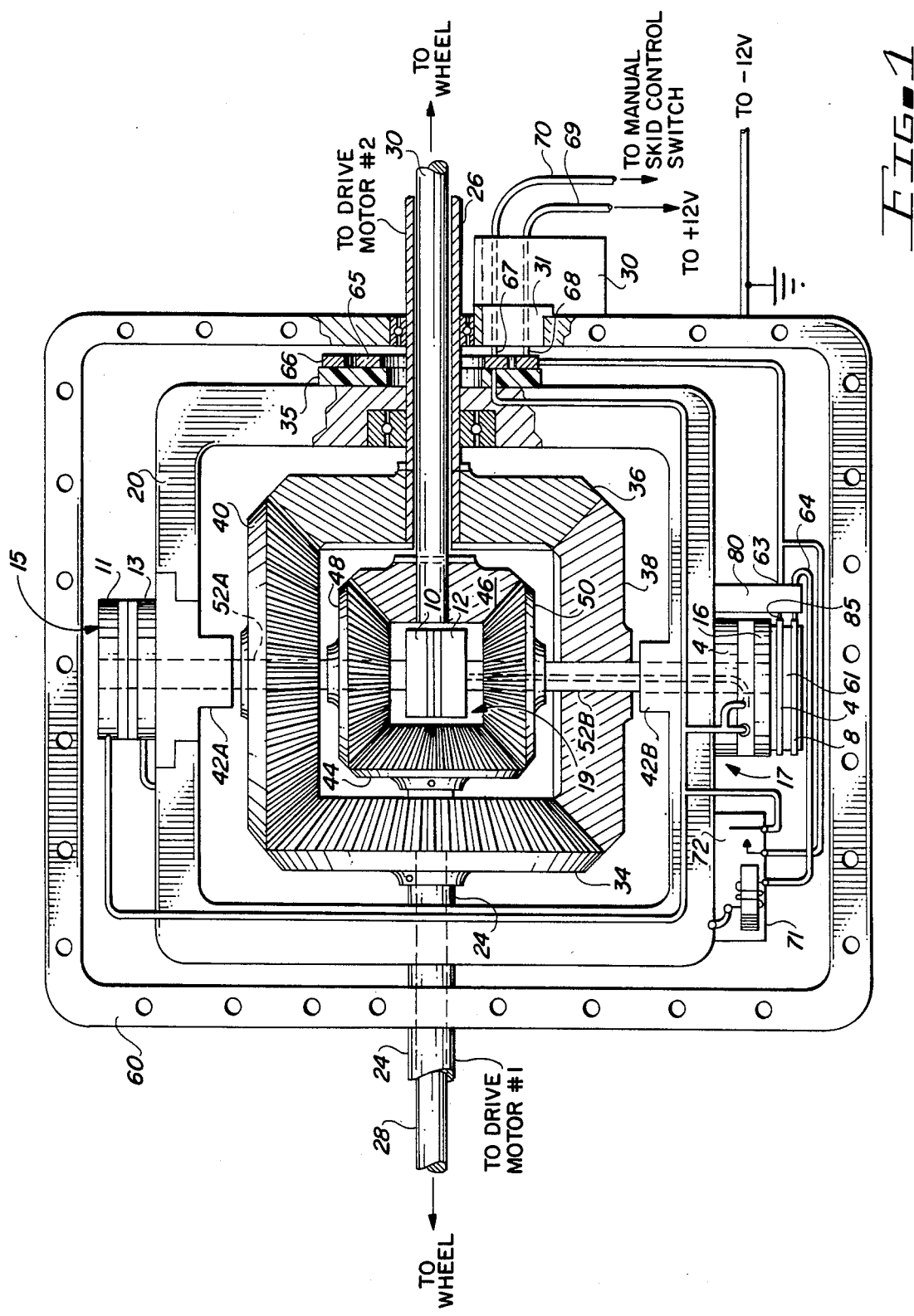
FIG. 1 is a partially cutaway view of the dual transmission of my invention showing the locations of the electrical clutches and the wiring of the differential.

Referring to the FIG. 1, a double differential is shown partially cut away and housed in a differential casing 60. A first coaxial shaft 24 and 28 extends from one side of case 60 and a second coaxial shaft 26 and 30 extends from the opposite side. Shaft 28 is connected to one drive wheel of the vehicle and shaft 30 is connected to the opposite drive wheel of the vehicle. Shaft 24 is coupled to a first dc drive motor, not shown, and shaft 26 is coupled to a second dc drive motor, not shown. The two drive motors, in accordance with the above referenced patent, are controlled by a novel computer system to drive the double differential.

The double differential includes a bevel gear 34 connected to shaft 24 which is thereby turned by the first drive motor. A bevel gear 36 is attached to shaft 26 driven by the second drive motor. As may be noted, shafts 24 and 26 also pass through spider assembly 20. Spider assembly 20 includes caps 42 which support shafts 52A and 52B. Shaft 52A, which rotates in cap 42A, is attached to inner pinion gear 48 and shaft 52B which rotates in cap 42B is attached to inner pinion gear 50. First pinion gear 40 is free to rotate on shaft 52A and second pinion gear 38 is free to rotate on shaft 52B.

Inner bevel gear 46 is attached to drive shaft 30 which drives the wheel on the right in the drawing and inner bevel gear 44 drives drive shaft 28 driving the left wheel as shown in the drawing.

In accordance with the system shown in the '144 patent, the double differential will drive drive shafts 28 and 30 in the same direction at the same speed when inner pinion gears 48 and 50 are not rotating, which at such time spider 20 will be rotating at the same rpm as shafts 28 and 30. As will be noted in the drawing, three electrical clutches 15, 17, 19 are utilized in conjunction with the double differential. In the center and between inner pinion gears 48 and 50, an electrical clutch 19 is disposed having plates 10 coupled to shaft 52A and plates 12 attached to shaft 52B. When electrical clutch 10, 12 is disengaged, gears 48 and 50 can rotate independently. However, when electrical clutch 10, 12 is energized, gears 48 and 50 are locked together. Electrical clutch 15 is mounted on spider 20 with plates 13 anchored to cap 42 and plates 11 attached to shaft 52A. Similarly, electrical clutch 17 is mounted to spider 20 with plates 14 connected to cap 42B and plates 16 attached to shaft 52B. When electrical clutches 11, 13 and 14, 16 are energized, shafts 52a and 52b are immobilized and cannot turn.

To provide control of clutches 15, 17, 19 a centrifugal switch 61 is mounted to plates 16 such that rotation of those plates will close contacts between terminals and between terminals 63 and 64.

Figure 4:
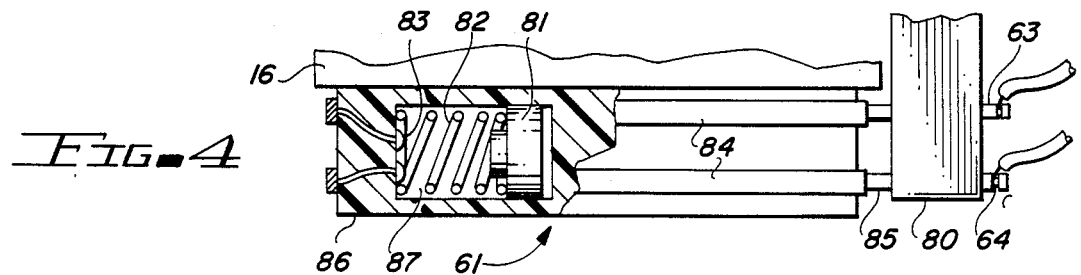
FIG. 4 is a partially cut away view of the centrifugal switch of the invention.

Details of centrifugal switch 61 are best seen with reference to FIG. 4 which shows a partial cutaway view. Switch 61 utilizes a cylindrical body 86 formed from plastic or other insulative material and having a cylindrical recess 87 provided therein. A set of two electrical contacts 83 in the outer wall of recess 87 is connected to a set of two external slip rings 84 around the periphery of body 86. A contact plunger 81, formed from a suitable conductive material such as brass, is disposed in recess 87 and biased by spring 82 to be normally in the position shown such that contacts 83 are not closed.

A brush holder 80 is attached to spider 20 and provides two brushes 85 in contact with slip rings 84, the brushes having terminals 63 and 64.

Since switch 61 is attached to clutch plate 16 which rotates with shaft 52B, body 86 will rotate when pinion gear 50 and shaft 52B rotate. If this rotational speed produces sufficient centrifugal force to permit plunger 81 to overcome the bias of spring 82, contacts 83 will bridged thereby closing terminals 63 and 64.

Electrical power is furnished to the system by means of a slip rings 65, 66 mounted to spider 20 by insulating block 80. A pair of spring loaded brushes 67, 68 is disposed in a block 31 which is slidably mounted to differential housing 60. Brushes 67, 68 contact slip rings 65, 66 respectively. Brush 68 is connected via lead 69 to a +12 volt or other power source in the vehicle and brush 67 is connected via lead 70 to a manual skid control switch discussed further hereinafter. One lead from each of the electrical clutches 15, 17, 19 is connected to one of contacts 72 of slow release relay 71 while the opposite leads from the electrical clutches are grounded to the frame of the differential providing a dc return to the battery through the chassis of the vehicle. The other one of contacts 72 is connected to battery via brushes 68. Thus, when centrifugal switch 61 operates, relay 71 closes and all of the clutches will be energized. The second slip ring 66 mounted on support and contacted by brush 67 permits the use of a manual skid control switch under the control of the vehicle operator which, when operated, also energizes clutches 15, 17, 19.

Slow release relay 71 which closes when centrifugal switch 61 closes delays its opening for a period of up to two seconds after switch 61 is opened. As may be noted, contacts 72 of relay 71 are connected operate clutches 15, 17 and 19 and, by virtue of its slow release characteristics, will permit the electrical clutches to remain engaged for a short time after switch 61 opens.

Figure 2:
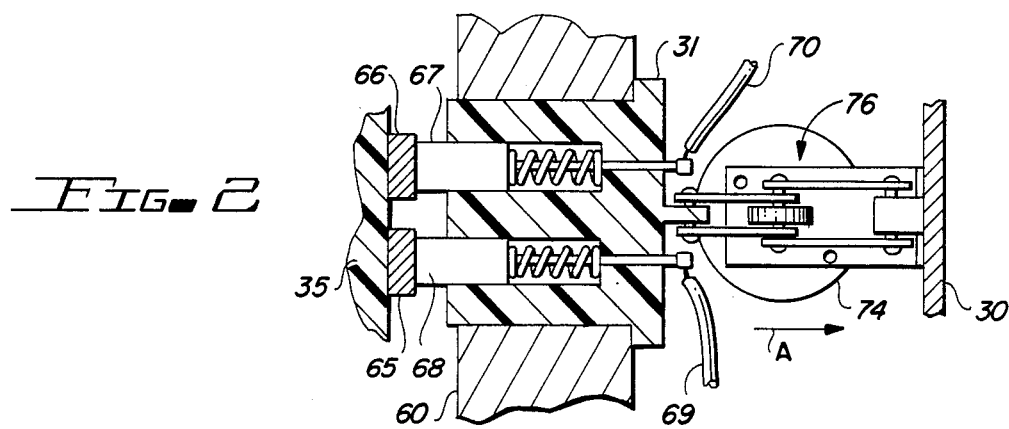
FIG. 2 is a cross-sectional view of the brush support block in the dffferential housing and the toggle operating solenoid.
Figure 3:
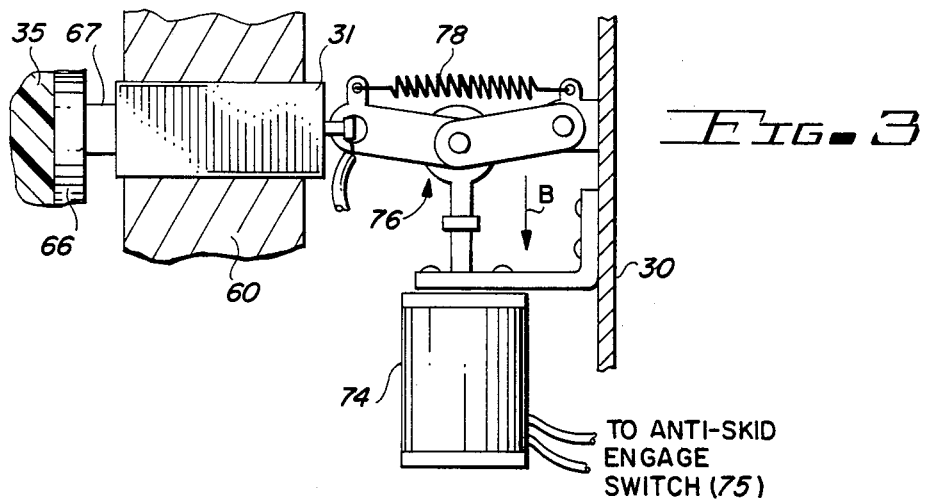
FIG. 3 shows the solenoid and toggle arrangement for moving the brushes away from the slip rings.

Details of the mounting of brushes 67, 68 are shown in FIGS. 2 and 3. Block 31 is seen in cross section in FIG. 2 with brushes 67, 68 in contact with slip rings 65, 66 for normal operation of the anti-skid system of the invention. However, I have found it desirable to disengage brushes 67, 68 during normal driving to minimize brush wear yet be able to engage the brushes during hazardous driving. Thus, block 31 is permitted to slide in differential housing 60. A solenoid-operated toggle device 76 is coupled between housing 30, attached to differential housing 60, and brush block 31. As best seen in FIG. 3, when solenoid 74 is energized, toggle 76 moves block 31 to the fully engaged position as shown. When solenoid 74 is released, an internal spring (not shown) and helper spring 78 cause toggle 76 to move as shown by arrow B and brush block 31 will move away from slip rings 65, 66 as indicated by arrow A.

Figure 5:
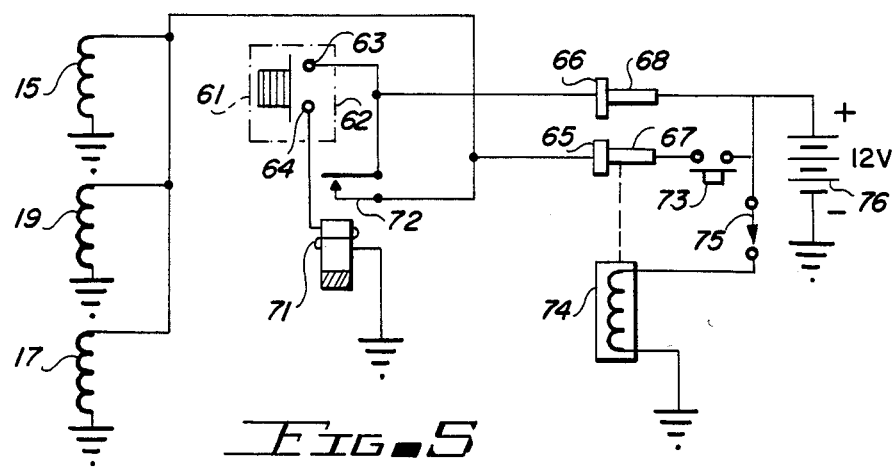
FIG. 5 is a schematic diagram of the electrical wiring required for my invention.

A schematic diagram of the electrical system of my invention is shown in FIG. 5. Switch 75 is utilized to engage the system by operating solenoid 74, moving brushes 67, 68 against slip rings 65, 66. In the condition shown, depressing push button 73 will energize clutches 15, 17, 19, locking shafts 28 and 30 together. The clutches will immediately release when push button 73 is released. If the vehicle should go into a skid, centrifugal switch 61 will close connecting battery 76 to slow release relay 71 which applies batteries to operate clutches 15, 19, 17. When the clutches engage, centrifugal switch 61 will open but slow release relay 71 will continue to hold for a short time and clutches 15, 17, 19 will continue to be engaged.

Having explained the construction of the anti-skid system as applied to the double differential shown in the FIG. 1, the operation will now be described. The driver may operate switch 75, enabling the system when conditions are such that skids are likely. When the vehicle is operating normally with both drive shafts 28 and 30 rotating at approximately the same rpm except for normal variations encountered in turning, spider assembly 20 is rotating, with both shafts 52A and 52B essentially not rotating except as required due to differential action in which case shafts 52A and 52B may rotate independently. Assume now that the vehicle starts into a skid due to loss of traction of one wheel or the other. In this case, pinion gear 50 will experience a rapid rotation, rotating shaft 52B, clutch plates 16 and centrifugal switch 61. Due to the centrifugal force created by the rapid rotation of shaft 52B, centrifugal switch will close contacts 83 which engages the three electrical clutches, stopping the rotation of gears 50 and 48 and locking those shafts to the spider 20. This immediately will tend to halt the rotation of the skidding wheel and to force both wheels to be turning at a speed determined by the drive motor speeds. The driver would then reduce power to the drive system causing the rotation of the wheels to slow down and have an opportunity to grip the driving surface. As will be noted, when shaft 52B ceases to rotate, centrifugal switch 61 will open. Since this will happen quickly, the system would, except for the slow release characteristic of relay 71, start its skidding action anew causing switch 61 to again close. To prevent such intermittent action, slow release relay 71 is selected and adjusted to maintain its contacts 72 closed, maintaining the locking of the shafts 52A and 52B by the electrical clutches for a selected delay period. This delay period is selected to give sufficient time for the vehicle to cease its skidding and for the operator to regain control at which time relay contact 72 will open, releasing the clutches and returning the system to normal operation.

If the vehicle begins to skid when switch 75 has not been operated, the driver would turn switch 75 and use push button 73 to manually lock and unlock the wheels to permit control of the skid. Push button 73 may be disposed on the steering wheel of the vehicle to obviate the necessity for the driver to remove his hand from the wheel.

Figure 6:
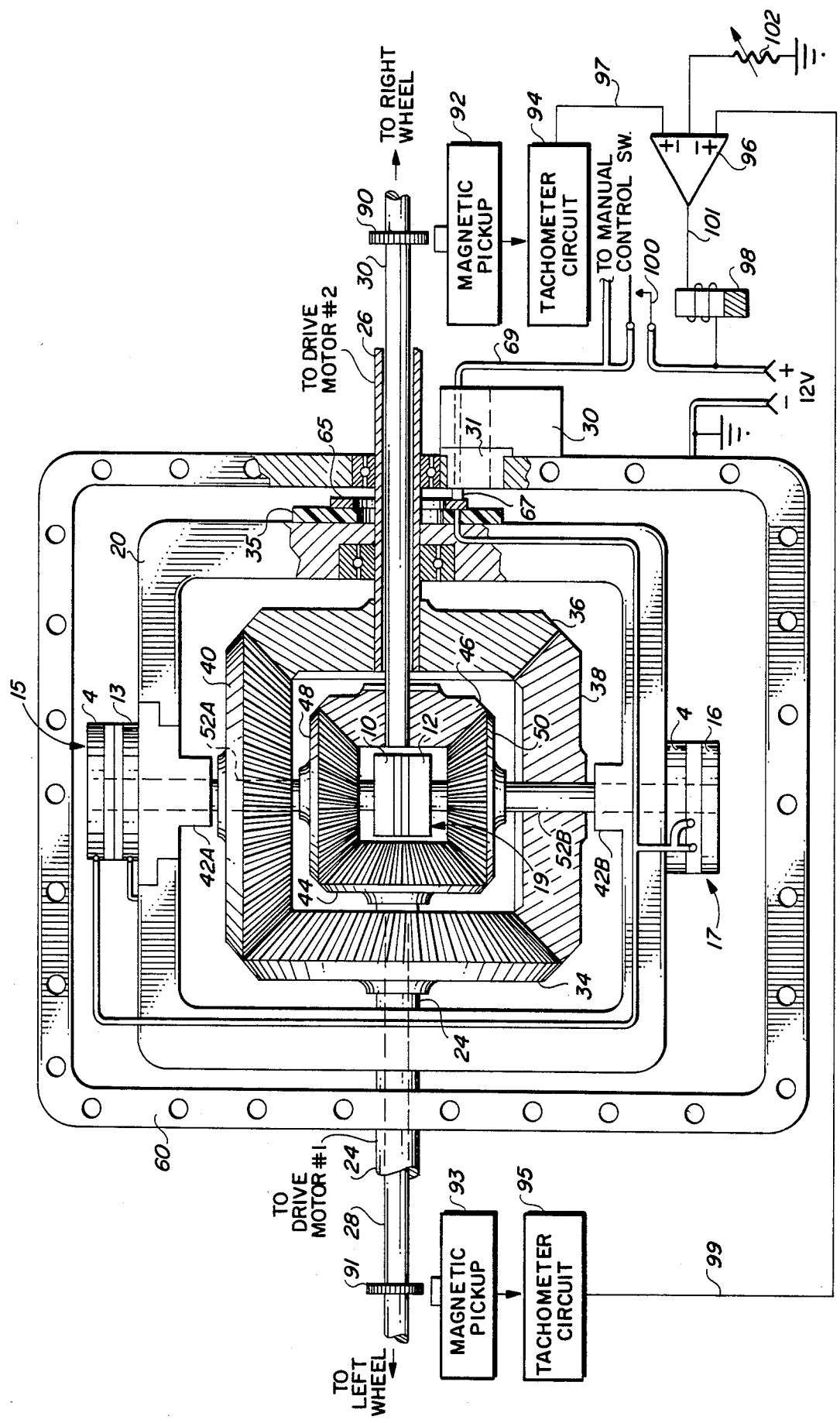
FIG. 6 is a partially cutaway view of the dual transmission with an alternative implementation of the means of operating the clutches thereof.

Having described one embodiment of my invention utilizing a centrifugal switch to sense when a skid is taking place, an alternative embodiment will now be described utilizing electronic sensing means in place of the centrifugal switch. Referring to FIG. 6, a cross sectional and partly cutaway view of the double differential portion of the vehicle is shown along with a block diagram of the sensing circuit. As may be noted, the mechanical portions of the double differential are essentially the same as previously described with respect to FIG. 1. However, it will be noted that the centrifugal switch 61 and the slow release relay 71 have been omitted from within differential housing 60. Additionally, slip ring 66 and brush 68 are no longer required in this implementation of my invention. Thus, the three electric clutches 15, 17, and 19 are connected in parallel and connected directly to slip ring 65. Single brush 67 is utilized and connects to external lead 69.

Sensing of the skidding condition is provided by two electronic tachometer type devices having a toothed ferromagnetic pickup wheel 90 attached to right wheel drive shaft 30 and a second ferromagnetic toothed pickup wheel 91 attached to left wheel shaft 28. A magnetic pickup 92 is mounted with its pole piece adjacent to right pickup 90 and magnetic pickup 93 is mounted adjacent to left pickup wheel 91. As is well known in this art, the electrical outputs from pickups 92, 93 will be an ac voltage produced by the movement of the teeth of wheels 90 and 91 across the pickup poles with the resulting variations in reluctance causing the generation of ac output signals having frequencies determined by the number of teeth on the wheels and the rpm of the shafts. The output from magnetic pickup 92 is fed to tachometer circuit 94 and the output from magnetic pickup 93 is fed to tachometer circuit 95. Tachometer circuits 94, 95 serve to produce a dc output voltage on their respective output leads 97 and 99.

A comparison circuit 96 is provided having an offset voltage control 102. Comparison circuit 96 compares the magnitude of the voltage on lead 97 to the magnitude of the voltage on lead 99. Offset control 102 is adjusted to cause comparison circuit 96 to produce an output only when the difference in magnitudes of such voltages exceeds a selected value of offset voltage. The offset voltage is selected to prevent an output from comparison circuit 96 due to normal variations in the rpm of the right and left wheel such as would be encountered in making sharp turns and to produce an output from comparison circuit 96 only when one wheel is spinning at a much higher rate than the opposite wheel, indicative of a skidding condition. In such event, comparison circuit 96 produces a contact closure on its output lead 101 operating slow release relay 98. This operation closes contacts 100 applying power via lead 69, brush 67, and slip ring 65 to electric clutches 15, 17 and 19. The operation from this point is identical to that previously described with respect to FIG. 1.

While I have shown a slow release relay 98 to provide the desired delay in releasing the operated clutches, it will be apparent to those of skill in the electronic art to utilize a solid state relay with a controllable delay through the use of simple RC circuits, one shots, or the like. Thus, the tachometer circuits, the comparison circuits, and the control relay circuits may be integrated as semiconductor chips for higher reliability and low cost.

Figure 7:
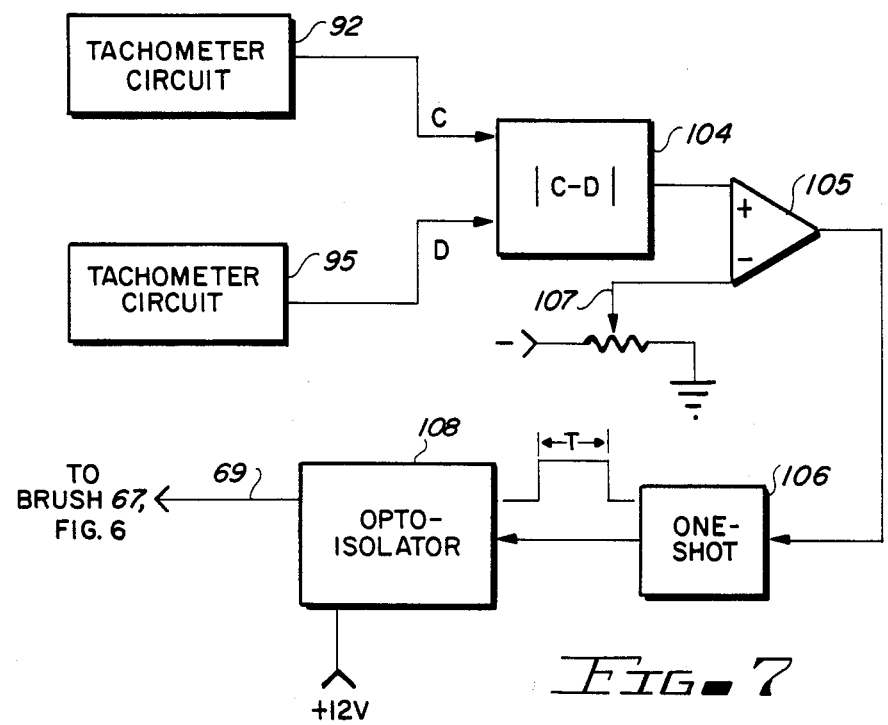
FIG. 7 is a block diagram of the electronic tachometer and comparison circuits of FIG. 6.

FIG. 7 shows a block diagram of a suitable electronic circuit for producing the desired comparison between rpm's of shafts 28 and 30. The output from tachometer circuit 94 is shown as C and the output from tachometer circuit 95 as at D. Subtractor circuit 104 performs the mathematical function of subtracting D from C and outputting a voltage level proportional to the magnitude of the difference. The magnitudes are compared in comparator 105 with the offset voltage selected by control 102. When the magnitude of the difference voltage between the outputs of tachometer circuits 92 and 95 exceed the selected offset voltage, which would be indicative of a skid condition, the output of comparator 105 goes HIGH, triggering one shot 106. One shot 106 produces an output pulse having a duration T as shown selected to produce a desired delay or slow release function with respect to the electric clutches. Thus, the one shot output is utilized to enable opto-isolator 108 to conduct during time T, closing the circuit from the +12 volt source to the electric clutches in the differential via lead 69 and brush 67. When clutches 15, 17 and 19 are energized, the outputs from tachometer circuits 92 and 95 will then be equal and the output from comparator 105 will return to the LOW condition. Thus, when the output from one shot 106 returns to zero, opto-isolator 108 will open the clutch circuit, returning the differential to normal operation.

Figure 8:
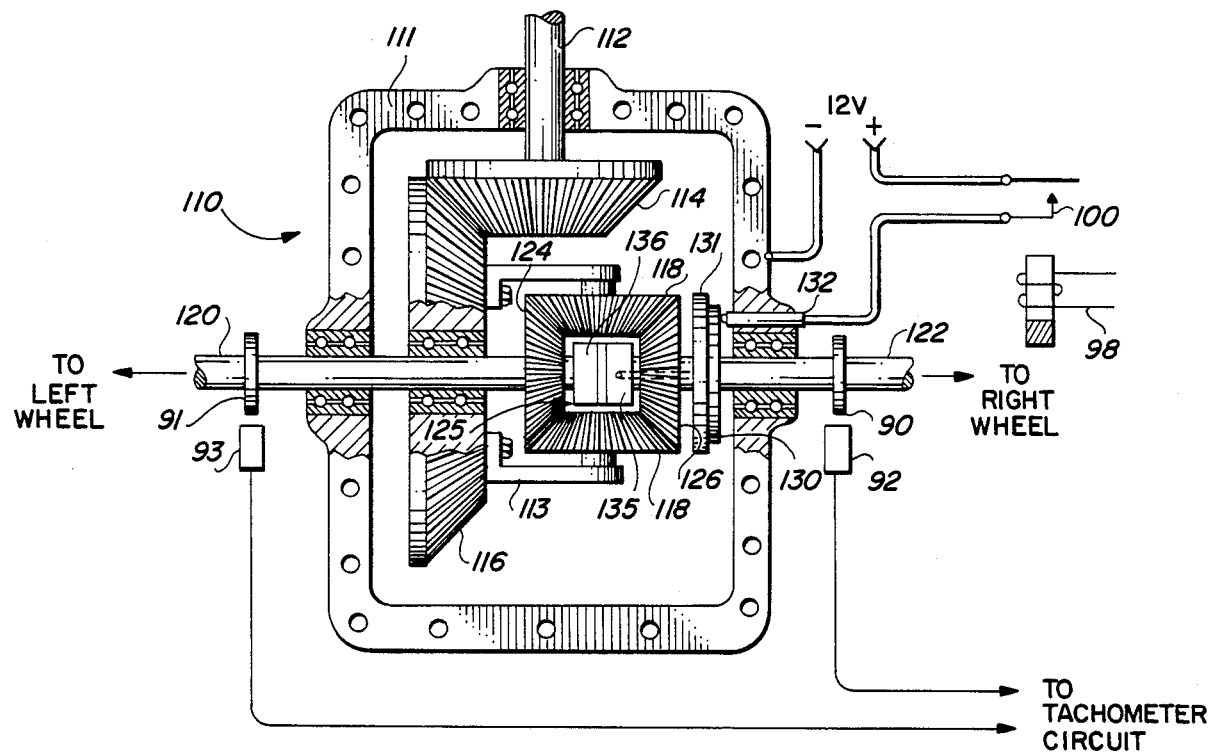
FIG. 8 shows a conventional single differential with the anti-skid system of my invention.

Turning now to FIG. 8, a conventional single differential 110 is shown with the anti-skid system of my invention applied thereto. Housing 111 is shown partially cut away. Drive shaft 112 from the vehicle transmission (not shown) drives pinion gear 114 engaged with ring gear 116. Spider assembly 113 attached to ring gear 116 supports two spider gears 118 coupled to left drive gear 124 and right drive gear 126. Drive gear 124 drives left drive axle 120 and drive gear 126 drives right drive axle 122. Electric clutch 125 is disposed between gear 124 and gear 126, with clutch plates 136 attached to axle 120 and clutch plates 135 attached to axle 122. Normally, clutch 125 is disengaged and shafts 120 and 122 can rotate independently. Power is supplied to clutch 125 via slip ring 130 mounted on insulating block 131. Brush 132 mounted in housing 111 connects to relay contacts 100 operated from relay 98 of the tachometer circuit of FIGS. 7 and 8.

When the vehicle experiences a skidding condition, one shaft will spin at a higher rate than the other, causing relay 98 to operate, applying power to clutch 125. This action forces both wheels to rotate at the same rpm, permitting the driver to regain control of the skidding vehicle as previously described.

A novel anti-skid system for a vehicle using a double differential drive such as disclosed in my '144 patent has been described with reference to the preferred embodiment. Although specific elements have been disclosed for exemplary purposes, it will be obvious to those of skill in the art to make various modifications and such changes are considered to fall within the spirit of scope of my invention.

I claim:

1. In a vehicle drive system having a double differential in a housing, said differential driven by a first drive motor and a second drive motor, the first motor driving a first bevel gear and the second motor driving a second bevel gear, a first pair of pinion gears differentially driven by the first and second bevel gears, a spider assembly for supporting said pair of pinion gears, a second pair of pinion gears supported by the spider assembly, a third bevel gear connected to a first output shaft, said first shaft connected to a first vehicle drive wheel, a fourth bevel gear connected to a second output shaft, said second shaft connected to a second vehicle drive wheel, and the third and fourth bevel gears driven by the second pair of pinion gears, an anti-skid apparatus comprising:

first electric clutch means disposed on said spider assembly and connected to one of said second pair of pinion gears, second electric clutch means disposed on said spider assembly and connected to the other one of said second pair of pinion gears, and third electric clutch means disposed between and connected to said second pair of pinion gears, said first, second and third clutch means for selectively preventing said second pair of pinion gears from rotating independently and with respect to said spider assembly;

an electrical switch external to said housing;

slip ring means disposed on said spider assembly and electrically connected to said first, second and third electrical clutch means; and brush means disposed in said housing and contacting said slip ring means, said brush means connected to said external switch;

whereby operation of said switch connects said electric clutch means to a source of electrical power to thereby lock said second pinion gears to said spider assembly for forcing said first and second output shafts to rotate at the same speed.

2. In a vehicle drive system having a double differential in a housing, said differential driven by a first drive motor and a second drive motor, the first motor driving a first bevel gear and the second motor driving a second bevel gear, a first pair of pinion gears differentially driven by the first and second bevel gears, a spider assembly for supporting said pair of pinion gears, a second pair of pinion gears supported by the spider assembly, a third bevel gear connected to a first output shaft, said first shaft connected to a first vehicle drive wheel, a fourth bevel gear connected to a second vehicle drive wheel, and the third and fourth bevel gears driven by the second pair of pinion gears, an anti-skid apparatus comprising:

first electric clutch means disposed on said spider assembly and connected to one of said second pair of pinion gears, second electric clutch means disposed on said spider assembly and connected to the other of said second pair of pinion gears, and third electric clutch means disposed between and connected to said second pair of pinion gears, said first, second and third clutch means for selectively preventing said second pair of pinion gears from rotating independently and with respect to said spider assembly;

centrifugal switch means mounted on said first electric clutch means and adapted to rotate with said first one of said second pinion gears, said switch means having a pair of normally open contacts which when closed cause said first, second and third clutch means to engage;

slip ring means disposed on said spider assembly and electrically connected to said first, second and third electrical clutch means via said centrifugal switch contacts; and brush means disposed in said housing and contacting said slip ring means, said brush means connected to a source of electrical energy;

whereby operation of said centrifugal switch connects said electric clutch means to a source of electrical power to thereby lock said second pinion gears to said spider assembly for forcing said first and second output shafts to rotate at the same speed.

3. The apparatus as defined in claim 2 which further comprises time delay means connected to said centrifugal switch means for delaying release of said clutch means for a preselected time after opening of said contacts of said centrifugal switch.

4. The apparatus as defined in claim 3 in which:
said time delay means is a slow release relay having a set of normally open contacts which when closed cause said electric clutch means to engage; and
in which closure of said centrifugal switch contacts causes operation of said slow release relay.

5. The apparatus as defined in claim 4 in which said slip ring means includes:
a secondary slip ring connected directly to said first, second and third electrical clutch means;
a manually operable switch external to said housing; and
said brush means includes a secondary brush connected to said source of electrical energy via said manually operable switch.

6. The apparatus as defined in claim 2 in which said brush means includes:
a brush holder slidably disposed in said housing;
a toggle assembly attached to said brush holder; and
solenoid means operably connected to said toggle assembly for moving said brush holder between a slip ring contacting position and a slip ring noncontacting position.

7. The apparatus as defined in claim 6 in which further comprises a manually operable switch connected to said solenoid means.

8. In a vehicle drive system having a double differential in a housing, said differential driven by a first drive motor and a second drive motor, the first motor driving a first bevel gear and the second motor driving a second bevel gear, a first pair of pinion gears differentially driven by the first and second bevel gears, a spider assembly for supporting said pair of pinion gears, a second pair of pinion gears supported by the spider assembly, a third bevel gear connected to a first output shaft, said first shaft connected to a first vehicle drive wheel, a fourth bevel gear connected to a second vehicle drive wheel, and a third and fourth bevel gears driven by the second pair of pinion gears, and anti-skid apparatus comprising:
first electric clutch means disposed on said spider assembly and connected to one of said second pair of pinion gears, second electric clutch means disposed on said spider assesmbly and connected to the other of said second pair of pinion gears, and third electric clutch means disposed between and connected to said second pair of pinion gears, said first, second and third clutch means for selectively preventing said second pair of pinion gears from rotating independently and with respect to said spider assembly;
slip ring means disposed on said spider assembly and electrically connected to said first, second and third electrical clutch means;
brush means disposed in said housing and contacting said slip ring means:
first electronic tachometer means connected to said first output shaft for producing a first voltage proportional to the rpm of said first shaft;
second electronic tachometer means connected to said second output shaft for producing a second voltage proportional to the rpm of said second shaft;
comparison means connected to receive said first voltage and said second voltage for producing a control output signal only when the magnitude of the difference between said first and second voltages exceeds a preselected offset voltage value; and
slow release relay means operatively connected to receive said control signal from said comparison means and connected to said brush means whereby operation of said relay means connects said electric clutch means to a source of electrical power to thereby lock said second pinion gears to said spider assesmbly for forcing said first and second output shafts to rotate at the same speed.

9. The apparatus as defined in claim 8 in which said slow release relay means includes:
a one-shot; and
an opto-isolator having a control input connected to said one-shot and a controlled output connected to said brush means.

10. The apparatus as defined in claim 8 which further includes adjustment means for adjusting said offset voltage value.

* * * * *